US008830696B2

(12) United States Patent
Lin et al.

(10) Patent No.: US 8,830,696 B2
(45) Date of Patent: Sep. 9, 2014

(54) IMAGE DISPLAY APPARATUS

(75) Inventors: Wen Dong Lin, Shenzhen (CN); Ren Jie Gao, Shenzhen (CN); Shui Yong Yao, Shenzhen (CN); Yuan Wen Chen, Shenzhen (CN)

(73) Assignees: SANYO Electric Co., Ltd., Moriguchi-Shi (JP); SANYO Technology Center (Shenzhen) Co., Ltd., Shenzhen (CN)

( * ) Notice: Subject to any disclaimer, the term of this patent is extended or adjusted under 35 U.S.C. 154(b) by 325 days.

(21) Appl. No.: 13/222,511

(22) Filed: Aug. 31, 2011

(65) Prior Publication Data
US 2012/0051022 A1 Mar. 1, 2012

(30) Foreign Application Priority Data
Sep. 1, 2010 (CN) .......................... 2010 1 0287250

(51) Int. Cl.
H05K 7/02 (2006.01)
(52) U.S. Cl.
USPC ....................................... 361/810
(58) Field of Classification Search
USPC ....................................... 361/810
See application file for complete search history.

(56) References Cited

U.S. PATENT DOCUMENTS

| 6,614,579 | B2 * | 9/2003 | Roberts et al. | ................. 359/267 |
| 8,035,987 | B2 * | 10/2011 | Yasukawa | ...................... 361/810 |
| 2001/0005452 | A1 * | 6/2001 | Uchiyama et al. | ................. 396/6 |
| 2013/0027849 | A1 * | 1/2013 | Berumen | ................. 361/679.01 |

FOREIGN PATENT DOCUMENTS

CN 201509268 U 6/2010
JP 2005-309268 A 11/2005

OTHER PUBLICATIONS

Office Action issued Oct. 15, 2013 for corresponding Chinese Patent Application No. CN 201110213535.3.
Machine translation for CN 201509268 U published Jun. 16, 2010.

* cited by examiner

*Primary Examiner* — Forrest M Phillips
(74) *Attorney, Agent, or Firm* — NDQ&M Watchstone LLP

(57) ABSTRACT

An image display apparatus according to the present invention includes a housing, a front frame provided forward of the housing, and a display assembly accommodated in the housing. The display assembly includes a display and a transparent plate provided forward of the display. The transparent plate is larger in outer dimension than the display and has a flange portion extending outward with respect to an outer edge of the display. A seal member is interposed between the flange portion and an outer peripheral portion of the housing. When the housing and the front frame are fastened to each other, a front surface of the flange portion of the transparent plate is brought into pressure contact with a rear surface of the front frame, and the seal member is sandwiched between the front frame and the housing with a pressure applied thereto.

4 Claims, 4 Drawing Sheets

F I G. 5
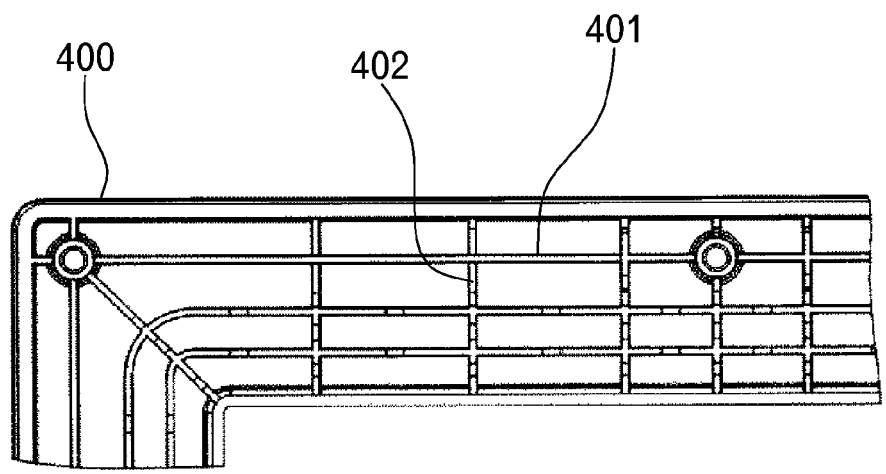

PATENT APPLICATION TEXT

IMAGE DISPLAY APPARATUS

This patent application claims priority based on Chinese Patent Application No. 201010287250.X, the disclosure of which is hereby incorporated by reference.

BACKGROUND OF THE INVENTION

1. Field of the Invention

The present invention relates to image display apparatuses, and more specifically to an image display apparatus suitable for outdoor installation.

2. Description of the Related Art

Heretofore, most of image display apparatuses have been designed with the assumption that they are installed indoors. Therefore, these image display apparatuses are poor in water resistance and moisture resistance, and hardly meet requirements for outdoor installation.

In the case of installing an image display apparatus outdoors, matters concerning dust resistance and water resistance should be taken into consideration first. Therefore, it is required to prevent electronic devices in the apparatus from being damaged due to moisture, dust, and the like in such a manner as to make the inside of the apparatus hermetic.

In order to meet this requirement, an image display apparatus illustrated in FIG. 1 adopts the following seal structure. That is, a seal member 3 is provided between a front frame 1 and a housing 2, and a sealant 5 is used for bonding between the front frame 1 and a transparent plate 4 provided forward of a display to ensure hermeticity, so that a hermetic chamber is formed between the housing 2 and the transparent plate 4. Thus, the image display apparatus is improved in water resistance and dust resistance.

SUMMARY OF THE INVENTION

An image display apparatus according to the present invention includes a housing 200 having an open front and including a chamber 210 formed therein, a front frame 400 provided forward of the housing 200, and a display assembly 100 accommodated in the chamber 210 of the housing 200.

The display assembly 100 includes a display 110 and a transparent plate 120 provided forward of the display 110. The transparent plate 120 is larger in outer dimension than the display 110, and has a flange portion 121 extending outward with respect to an outer edge of the display 110.

A seal member 300 extending around the chamber 210 is interposed between the flange portion 121 of the transparent plate 120 and an outer peripheral portion of the housing 200.

When the housing 200 and the front frame 400 are fastened to each other, a front surface of the flange portion 121 of the transparent plate 120 is brought into pressure contact with a rear surface of the front frame 400, and the seal member 300 is sandwiched between the front frame 400 and the housing 200 with a pressure applied thereto.

BRIEF DESCRIPTION OF THE DRAWINGS

FIG. 5 is a rear view illustrating a part of the front frame in an enlarged manner.

DETAILED DESCRIPTION OF EMBODIMENTS

With reference to the drawings, hereinafter, detailed description will be given of a liquid crystal television receiver for outdoor installation according to one embodiment of the present invention. The liquid crystal television receiver according to the embodiment of the present invention is used for displaying commercial advertisements and any other information. The liquid crystal television receiver is installed outdoors, and therefore, is required to have high water-resistant performance and dust-resistant performance.

Figure 1:
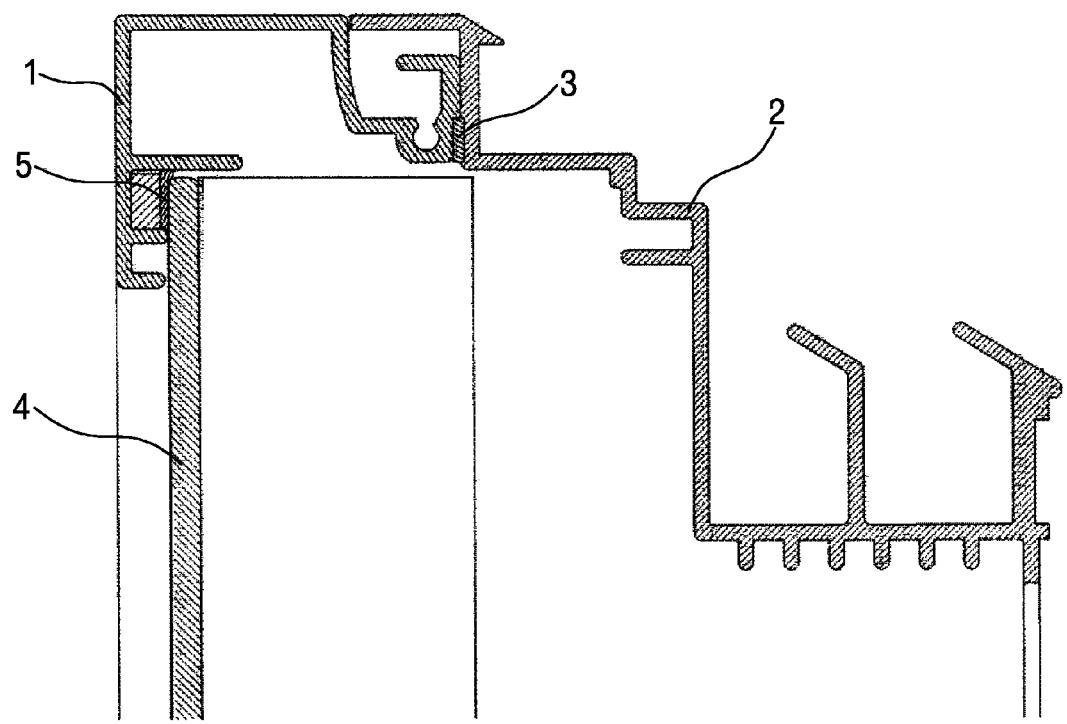
FIG. 1 is a cross-sectional view illustrating the main part of an image display apparatus according to the related art.
Figure 2:
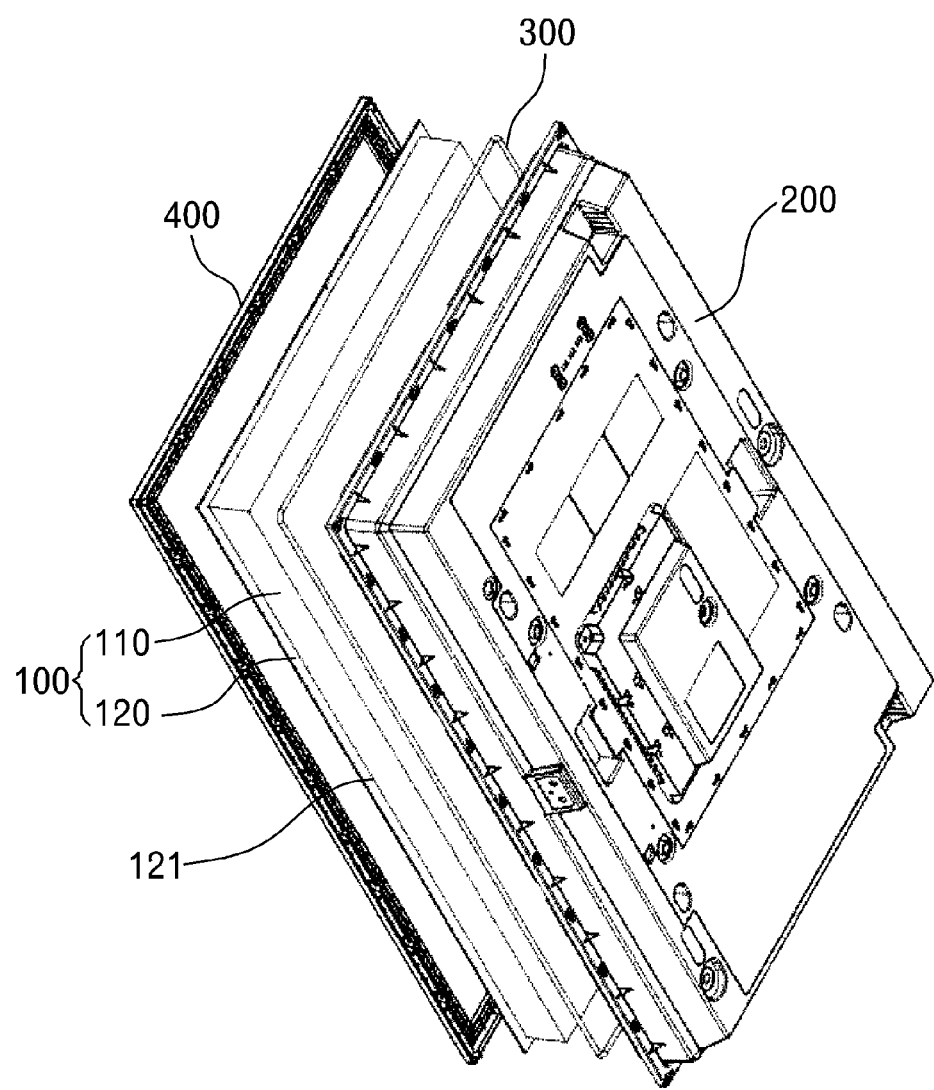
FIG. 2 is an exploded perspective view of a liquid crystal television receiver according to one embodiment of the present invention.
Figure 3:
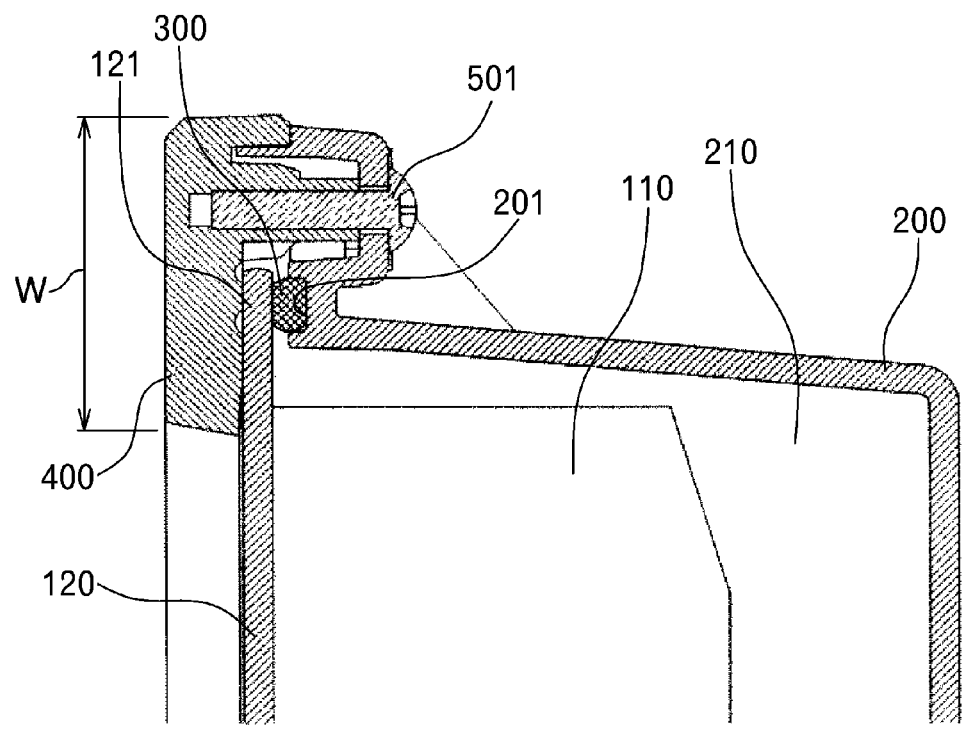
FIG. 3 is a cross-sectional view illustrating a seal structure of the liquid crystal television receiver.

As illustrated in FIGS. 2 and 3, the liquid crystal television receiver includes a synthetic resin housing 200 having an open front and including a chamber 210 formed therein, a synthetic resin front frame 400 provided forward of the housing 200, and a display assembly 100 accommodated in the chamber 210 of the housing 200.

The display assembly 100 includes a liquid crystal display 110 and a transparent plate 120 fixed by bonding to a front surface of the liquid crystal display 110. The transparent plate 120 is larger in outer dimension than the liquid crystal display 110, and includes a picture frame-shaped flange portion 121 extending outward with respect to an outer edge of the liquid crystal display 110.

The transparent plate 120 is made of reinforced glass, and plays a role of protecting a screen of the liquid crystal display 110.

A seal member 300 extending around the chamber 210 in a ring shape is interposed between the flange portion 121 of the transparent plate 120 and an outer peripheral portion of the housing 200.

The outer peripheral portion of the housing 200 has a concave groove 201 formed on a surface thereof opposed to the front frame 400, and the seal member 300 is fitted into the concave groove 201.

The concave groove 201 has a quadrangular cross-section, and the position of the seal member 300 is determined in such a manner that the seal member 300 is fitted into the concave groove 201.

Moreover, when the seal member 300 is sandwiched between the front frame 400 and the housing 200 with a pressure applied thereto to become deformed elastically, an inner wall of the concave groove 201 restricts the deformation of the seal member 300. Thus, the seal member 300 is controlled with regard to the shape after the deformation and the amount of deformation to ensure high sealability between the front frame 400 and the housing 200.

Herein, examples of a material of the seal member 300 may include rubber and any other well-known materials. Moreover, the cross-sectional shape of the concave groove 201 is not limited to the quadrangular shape, and examples thereof may include various cross-sectional shapes such as a V shape and an arch shape. Further, examples of a cross-sectional shape of the seal member 300 may include a circular shape, a rectangular shape, an oval shape and any other shapes.

In an assembly process, a double-sided adhesive tape (not illustrated) is applied onto a bottom of the concave groove 201, and the seal member 300 is fixed to the concave groove 201 by this double-sided adhesive tape. Thus, when the seal member 300 is sandwiched between the transparent plate 120 and the housing 200, the seal member 300 is held in the concave groove 201. This configuration is allowed to prevent the seal member 300 from being displaced, and therefore facilitates assembly operations. Herein, fixation using an adhesive agent may be adopted in place of the fixation using the double-sided adhesive tape.

As illustrated in FIG. 3, in the state that the seal member 300 is sandwiched between the flange portion 121 of the transparent plate 120 and the outer peripheral portion of the housing 200 and the rear surface of the front frame 400 is brought into contact with the front surface of the flange portion 121 of the transparent plate 120, the front frame 400 and the housing 200 are fastened to each other with screws 501 at plural positions.

Thus, the front surface of the flange portion 121 of the transparent plate 120 is brought into pressure contact with the rear surface of the front frame 400, and the seal member 300 is sandwiched between the front frame 400 and the housing 200 with a pressure applied thereto.

As the result, a seal part is configured to ensure high sealing performance between the flange portion 121 of the transparent plate 120 and the outer peripheral portion of the housing 200, and the chamber 210 is sealed with only this seal part. Accordingly, this configuration simplifies the seal structure.

Further, since the front frame 400 and the transparent plate 120 are merely brought into pressure contact with each other, the front frame 400 can be separated from the transparent plate 120 after the assembly. This configuration facilitates repair and maintenance operations.

Figure 4:
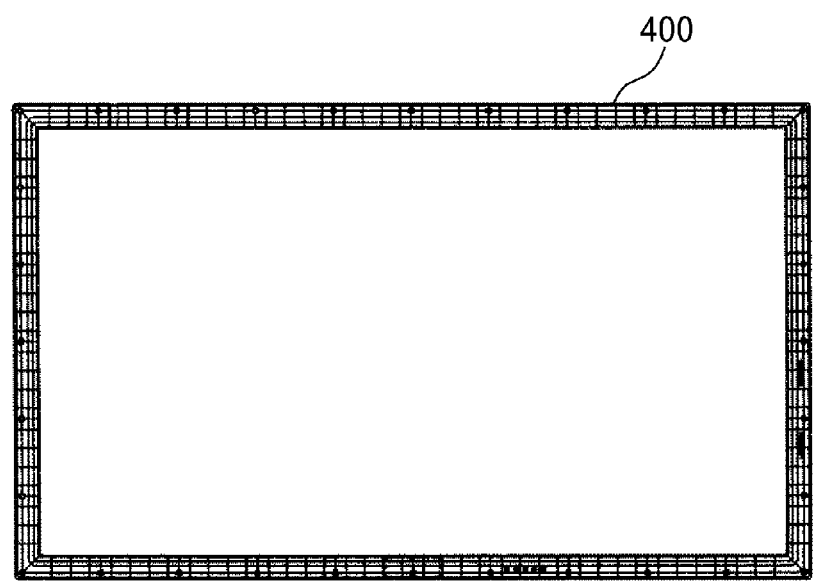
FIG. 4 is a rear view of a front frame in the liquid crystal television receiver.

In the liquid crystal television receiver, since the seal structure is simplified, a width W of the front frame 400 illustrated in FIG. 3 can be made narrow. This configuration allows reduction in weight of the front frame 400. In this case, since the front frame 400 is degraded in strength, plural horizontal reinforcing ribs 401 and plural vertical reinforcing ribs 402 intersecting the horizontal reinforcing ribs 401 are formed to protrude from the rear surface of the front frame 400, as illustrated in FIGS. 4 and 5.

This configuration enhances the strength of the front frame 400 and compensates the reduction in strength due to the narrowed width W of the front frame 400.

According to the liquid crystal television receiver, since the seal structure is simplified and the repair and maintenance operations become facilitated, reduction in product costs can be achieved. Moreover, since the width of the front frame 400 is made narrow, the reduction in weight of the front frame 400, furthermore, the reduction in weight of the entire apparatus can be achieved.

The apparatus of the invention is not limited to the forgoing embodiment in construction, but can be modified by one skilled in the art without departing from the sprit of the invention as set forth in the appended claims. For example, the transparent plate 120 is not limited to a glass plate, and examples thereof may include an acrylic plate, and any other hard boards made of transparent or semitransparent materials.

Moreover, the present invention is widely applicable to not only the liquid crystal television receiver for outdoor installation, but also, for example, image monitors to be installed in a high-humidity environment and various image display apparatuses required to have water resistance and dust resistance.

What is claimed is:

1. An image display apparatus comprising:
   a housing having an open front and including a chamber formed therein;
   a front frame provided forward of the housing;
   a display assembly accommodated in the chamber of the housing, and including a display and a transparent plate fixed directly to a front surface of the display by bonding, wherein the transparent plate is larger in outer dimension than the display and has a flange portion extending outward with respect to an outer edge of the display; and,
   an elastic seal member extending around the chamber is interposed between the flange portion of the transparent plate and an outer peripheral portion of the housing, the outer peripheral portion of the housing being formed on a surface thereof opposed to the front frame with a groove for fitting the elastic seal member thereinto,
   wherein, when the housing and the front frame are fastened to each other, a front surface of the flange portion of the transparent plate is brought into pressure contact with a rear surface of the front frame, and when the seal member is sandwiched between the front frame and the housing with a pressure applied thereto to become deformed elastically, an inner wall of the groove serves to restrain the deformation of the elastic seal member to control the shape and amount to be deformed.

2. The image display apparatus according to claim 1, wherein a double-sided adhesive tape for fixing the seal member is applied onto the groove of the housing.

3. The image display apparatus according to claim 2, wherein the front frame has plural ribs formed to protrude from a surface thereof opposed to the housing.

4. The image display apparatus according to claim 3, wherein the plurality of reinforcing ribs include a horizontal reinforcing rib and a vertical reinforcing rib which intersect each other.

\* \* \* \* \*